United States Patent [19]

Winfield

[11] 4,312,007

[45] Jan. 19, 1982

[54] SYNCHRONIZED GRAPHICS INK JET PRINTER

[75] Inventor: Augustus W. Winfield, Fort Collins, Colo.

[73] Assignee: Hewlett-Packard Company, Palo Alto, Calif.

[21] Appl. No.: 61,134

[22] Filed: Jul. 26, 1979

Related U.S. Application Data

[63] Continuation-in-part of Ser. No. 959,816, Nov. 9, 1978, abandoned.

[51] Int. Cl.³ .............................................. G01D 15/18

[52] U.S. Cl. .................................................. 346/140 R

[58] Field of Search .................................. 346/140 PD

[56] References Cited

U.S. PATENT DOCUMENTS 3,334,354 8/1967 Mutschler ....................... 346/140 R
3,409,904 11/1968 Maiershofer ....................... 346/101
3,588,906 6/1971 Van Brimer ....................... 346/75 X
3,747,120 7/1973 Stemme ................... 346/140 PD X
3,787,884 1/1974 Demer ..................... 346/140 PD X
3,828,357 8/1974 Koeblitz ....................... 346/140 PD
3,940,773 2/1976 Mizoguchi ................... 346/140 PD
4,065,775 12/1977 Hou ............................. 346/140 PD
4,072,958 2/1978 Hayami ....................... 346/140 PD

*Primary Examiner*—Joseph W. Hartary
*Attorney, Agent, or Firm*—Edward L. Miller

[57] ABSTRACT

An ink jet printer utilizing an electrically driven and piezoelectrically actuated print head and a rotating cylindrical drum synchronizes the generation of ink drops with the instantaneous speed of the drum to compensate for variations in the speed of the drum. The print head is driven by a triggerable single cycle sine wave generator. The drum and a lead screw for advancing the print head across the drum are each driven by stepper motors.

2 Claims, 3 Drawing Figures

AN ELECTRICALLY DRIVEN PIEZOELECTRICALLY ACTUATED INK JET PRINT HEAD

SIMPLIFIED WAVEFORMS FOR THE BLOCK DIAGRAM

SYNCHRONIZED GRAPHICS INK JET PRINTER

This is a continuation-in-part of a copending application also entitled "SYNCHRONIZED GRAPHICS INK JET PRINTER", Ser. No. 959,816, now abandoned filed Nov. 9, 1978 by Augustus Warren Winfield, and assigned to the present assignee.

REFERENCES TO ISSUED PATENTS

The subject matter of this application is related to the following issued U.S. Pat. Nos.:

3,747,120 issued to Stemme on July 17, 1973, and entitled "ARRANGEMENT OF WRITING MECHANISMS FOR WRITING ON PAPER WITH A COLORED LIQUID";

3,940,773 issued to Mizoguchi et al. on Feb. 24, 1976, assigned to the Matsushita Electric Industrial Co., and entitled "LIQUID DROPLET WRITING MECHANISM";

4,072,958 issued to Hayami et al. on Feb. 7, 1978, assigned to the Matsushita Electric Industrial Co., and entitled "INK INJECTION TYPE WRITING SYSTEM USING AMPLITUDE-MODULATED ELECTRICAL SIGNALS".

The above-mentioned U.S. patents are hereby incorporated by reference.

BACKGROUND OF THE INVENTION

1. Field of the Invention

This invention relates generally to printing or recording devices that deposit ink on a recording medium, such as paper. More specifically, the invention relates to such devices wherein a rotating cylindrical drum moves a sheet of paper beneath an electrically driven and piezoelectrically actuated ink ejection mechanism. In particular, the invention relates to the aspects of controlling the rotation of the drum and to the subsequent timing of the ejection of the ink.

2. Description of the Prior Art

Good descriptions of the nature of one type of piezoelectrically actuated ink jet print head are contained in the Stemme and Mizoguchi patents mentioned above. An explanation of one way to control such a print head in the context of operation in a facsimile device is contained in the Hayami patent. The essential teachings of those patents are as follows.

The mechanical motion available from an electrically driven piezoelectric crystal can be used to move a diaphram and force a small amount of the ink in a chamber through a small orifice, so that the ejected ink impinges onto a sheet of paper in the vicinity of the orifice. The geometery of the chamber, the size of the orifice and the nature of the crystal can be chosen so that exactly one drop of ink is ejected for each cycle of mechanical movement of the crystal. In the absence of excitation of the crystal, surface tension keeps the ink from leaking out through the orifice.

A problem associated with printers of this type concerns the generation of spurious ink drops due to unwanted resonances of the ink in the chamber. The resonances are aggravated both by various data patterns and by increases to the basic drop generation rate. The effect of these spurious drops is to visibly reduce the quality of the printed image. The Hayami patent is an attempt to deal with this problem by continuously exciting the print head at a level below a threshold for ejecting drops, and using a synchronized increase in excitation amplitude to eject a drop. One drawback to this scheme is the requirement that the generation of the drop be synchronized with an oscillator through the action of a zero crossing detector. Possible variations in drum speed are not accounted for, perhaps because those inventors ensured that there was no significant variation in drum speed.

For reasons mentioned below, it was desirable to employ a print head control scheme that is tolerant of continuous variation in the angular velocity of the drum. The control scheme of the Hayami patent was tried, first without any attempt to account for variations in drum speed. While the print head itself performed well, the placement of the drops on the paper was totally unacceptable.

Next, the Hayami scheme was modified in the following way. The frequency of the continuous low level excitation was made to track the variations in the angular velocity of the drum. Whenever drops were required amplitude modulation at the zero crossing points was used to raise the excitation to levels sufficient to eject ink. This scheme corrected the positional accuracy of drop placement, but the quality of the drops (size, tendancy towards spurious drop generation) was found to be very difficult to control. The basic reason for this difficulty is connected with the fact that the excitation threshold for drop ejection and the optimum value of excitation for drop ejection both vary as a function of excitation frequency. It was exactly that frequency, however, that was made to vary as a function of variations in the angular velocity of the rotating cylindrical drum.

The result of those experiments was to abandon attempts to use continuous low level excitation with amplitude modulation. It was too difficult to sufficiently control to avoid significant degradation in the quality of the printed result, given the continuous variations in the angular velocity of the drum.

SUMMARY OF THE INVENTION

The present invention employs a triggerable single cycle sine wave generator to excite the print head. The single cycle sine wave generator is triggered by a data stream synchronized to the rotation of the drum. The synchronization is needed, as a stepper motor is used to drive the drum and while the average angular velocity of the drum is exact, there are continuous small scale variations in the instantaneous angular velocity that would otherwise produce a noticable degradation in the quality of the printed result.

The usual method of driving the drum is to use a motor applying continuous torque to the drum, rather than one supplying impulse torque, as with the stepper motor. It is from the impulse nature of the applied torque that the variations in the angular velocity of the drum arise. However, synchronization can remove the ill effects of the variations, and the stepper motor can be used to great advantage in positioning the drum to selected positions during automatic paper loading. Furthermore, stepper motors offer high reliability and low RFI, which combine to make them an attractive choice for driving the drum.

The use of a triggerable single cycle sine wave generator to drive the print head offers the following advantage. Since the period of the signal exciting the print head is constant, the optimum value of excitation also remains relatively constant even though the signal may be applied at irregular intervals. In short, the print head sees the same manner of excitation for each drop, and responds to that excitation in a generally constant way, even through the external circumstances of drum speed and data pattern are constantly changing.

The combination of synchronization with triggerable excitation produces both positional accuracy of drop emplacement and drops of good quality.

DESCRIPTION OF THE PREFERRED EMBODIMENT

Figure 1:
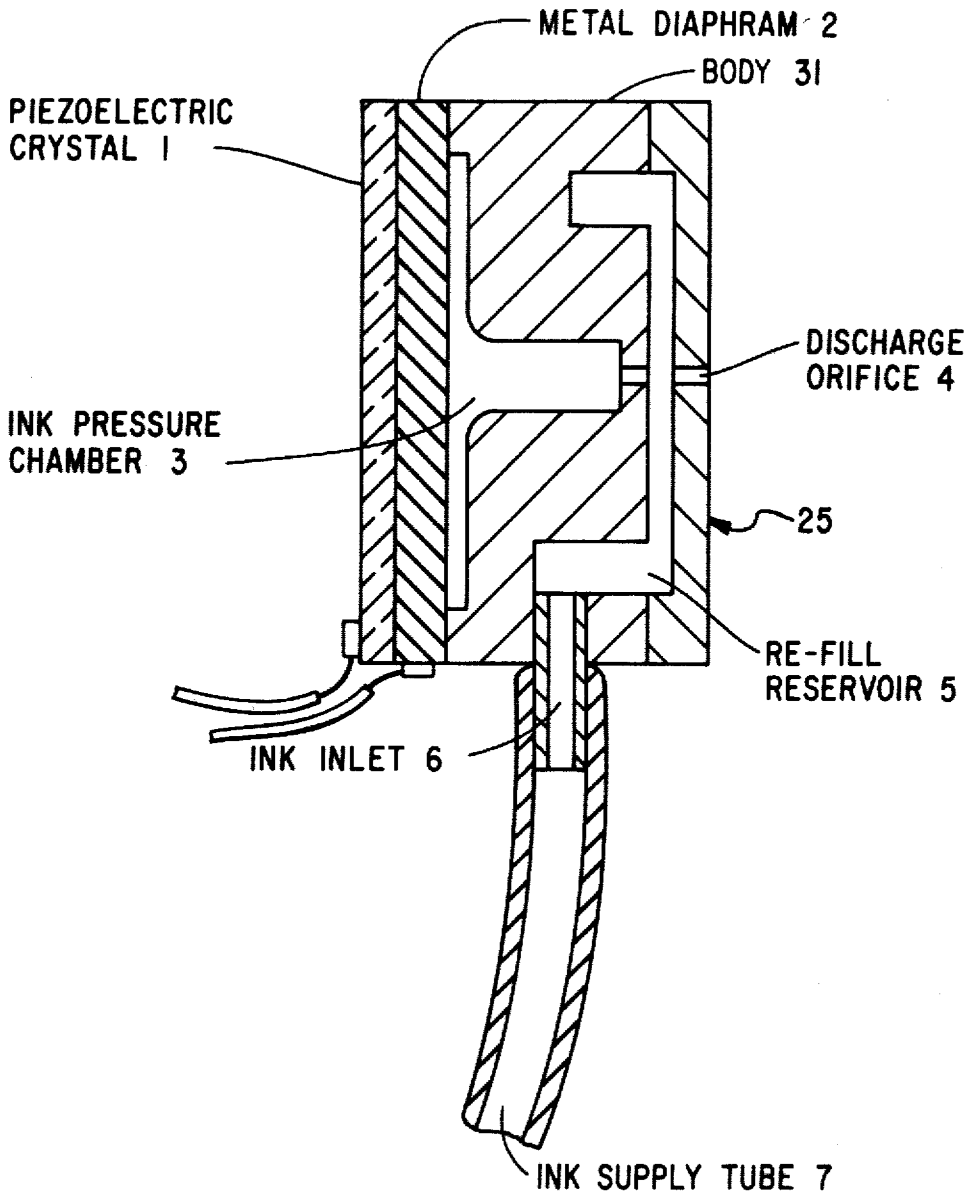
FIG. 1 is a cross sectional view of a representative type of electrically drive piezoelectrically actuated ink jet print head to which the invention is applicable.

FIG. 1 is a cross sectional view of an ink jet print head 25 that is electrically driven and piezoelectrically actuated. An ink pressure chamber 3 is formed between a cavity in a housing 31 and a metal diaphram 2 thin enough to be flexed by a piezoelectric crystal 1 that is bonded to the metal diaphram. Leads are attached to the crystal in the manner shown, so that when a signal is applied the crystal flexes. The direction of the flexing is controlled by the polarity of the applied voltage. When the crystal flexes in one direction ink is forced out through the discharge orifice 4. When the crystal flexes in the other direction ink is drawn into the refill reservoir 5 and also into the ink pressure chamber. The ink supply tube 7 supplies ink from a reservoir (not shown) to an ink inlet 6 from which ink is available to the refill reservoir.

The geometry of the internal ink pressure chamber and the size of the orifice are such that, given the crystal's ability to vary the volume of the ink pressure chamber, a single droplet of ink is ejected for each flexing of the crystal. The amplitude of the signal that excites the crystal is also important. Increasing amplitudes cause increasing amounts of flexing. Along with the geometry of the physical portions of the ink jet, the amplitude of the signal driving the crystal must also be optimized.

Figure 2:
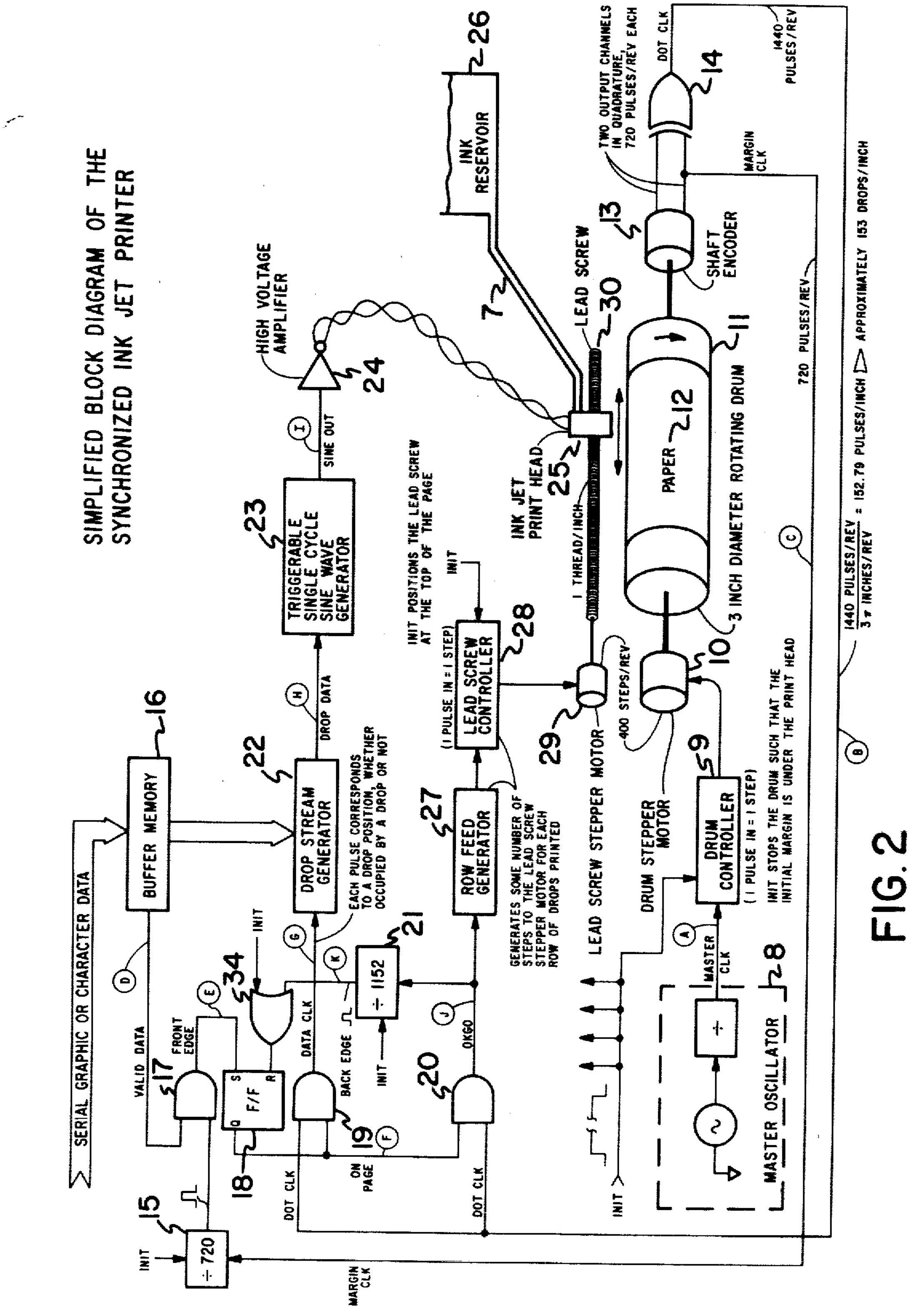
FIG. 2 is a simplified block diagram of a graphics ink jet printer using the print head of FIG. 1 and embodying the synchronization and excitation principles of the invention.

FIG. 2 is a simplified block diagram of a synchronized ink jet printer using the ink jet of FIG. 1 and constructed according to a preferred embodiment of the invention. Its operation is as follows.

A master oscillator assembly 8 comprising an oscillator and a divider produces a signal called MASTER CLK. This signal serves to generally determine the speed at which the cylindrical drum 11 rotates. MASTER CLK is fed to a drum controller 9 whose function is to convert each pulse of MASTER CLK into the next consecutive step of the drum stepper motor 10. The drum stepper motor is mechanically connected to the cylindrical drum and imparts a generally constant rotary motion to it; however, due to the nature of a stepper motor there are continuous small scale local variations in the angular velocity of the cylindrical drum.

The paper 12 that is to receive the printing is wrapped onto the cylindrical drum. Rotation of the drum produces horizontal displacement along the "width" of the paper. A lead screw 30 translates the print head along the "length" of the paper for vertical displacement.

A shaft encoder 13 is employed as a digital tachometer to continuously measure the angular velocity of the cylindrical drum. An important aspect of this measurement is ability to register changes in the angular velocity occurring even just a few degrees of rotation apart. The particular shaft encoder used in the present embodiment has two output channels, arranged in quadrature, of seven hundred and twenty pulses per revolution each. One of those channels is taken to be the signal MARGIN CLK. The two channels are combined by exclusive OR gate 14 to produce a signal DOT CLK having 1,440 pulses per revolution. DOT CLK represents both the angular velocity of the drum and the location of the various drop positions along the cylindrical displacement path of the paper.

Data to be printed is supplied to a buffer memory 16. The data can represent either character or graphics data. At a minimum the buffer memory must be capable of storing either an entire line of characters, or in the case of graphics data, information representing an entire row of pixels (each pixel would be one or more drops).

From the buffer memory the data is sent to a drop stream generator 22 whose function is to generate a sequence of logical values representing the drops needed for the current horizontal row being printed. In the case of characters the drop stream generator performs a character-to-rows-of-drops conversion generally similar to that used by thermal printers. In the case of graphics data an arbitrary data stream of pixels is provided by the buffer memory, each of which must be converted to a corresponding number of drops. The output generated by the drop stream generator is called DROP DATA. DROP DATA consists of a series of logical values, each of which corresponds to a drop position, and each of which identifies whether there is to be a drop in that position or not. Changes in the logical values of DROP DATA are synchronized with the recurring appearance of the edge of the printing space on the paper as the cylindrical drum rotates, and are also synchronized with DOT CLK. Thus, the margins of the printed matter are straight, and drops in similar positions in consecutively printed rows line up with each other, even though there may be variations in the angular velocity of the cylindrical drum. The synchronization is accomplished as follows.

The signal MARGIN CLK is divided by seven hundred and twenty by a divider 15. The nature of this divider is that of a counter that can be preset to a preprogrammed count. The counter counts down, and produces an output pulse when the count reaches zero. Then the counter automatically resets itself to the preprogrammed count and the process starts over. The pulse output of the divider is combined by an AND gate 17 with a signal VALID DATA from the buffer memory to produce a signal FRONT EDGE. This signal sets a flip flop 18. The significance of the flip flop being set is that the front edge, or initial margin, of the printing space on the paper has come under the print head, and also that valid data is available to be printed. When the flip flop is set its Q output is true. The Q output is used as a signal called ON PAGE. ON PAGE is combined with DOT CLK by an AND gate 19 to produce DATA CLK. DATA CLK is the clock used to synchronize the generation of the logical values of DROP DATA by the drop stream generator.

In addition, ON PAGE is combined by an AND gate 20 with DOT CLK to produce the signal OKGO. OKGO is divided by 1,152 by divider 21 (similar in nature to divider 15) to produce a signal BACK EDGE, whose purpose is to reset the flip flop 18. The significance of BACK EDGE is that the trailing edge, or other margin, of the printing space has come under the print head, and that printing should cease. Resetting flip flop 18 removes ON PAGE and subsequentially removes DATA CLK. That in turn inhibits the drop stream generator from producing further output pulses.

An additional aspect of the operation of the ink jet printer of FIG. 2 concerns the signal INIT. This signal is provided by the circuitry (not shown) which starts the entire printing operation once a new sheet of paper has been loaded. The details of its generation are outside the scope of the present invention; however, its effects, once it is generated, are of concern here.

What INIT does is to align the entire synchronization process with the initial margin of the paper. In response to INIT the drum controller 9 positions the drum such that the initial margin is under the orifice of the ink jet print head. Also in response to INIT, the lead screw controller 28 positions the ink jet print head at the top of the page. The dividers 15 and 21 are reset, as is flip flop 18. Drum rotation commences after INIT goes away. As the drum begins to rotate and accelerates up to speed, the synchronization scheme properly tracks the position of the printing space beneath the ink jet print head.

The signal OKGO is also sent to a row feed generator 27, which in turn sends a number of pulses to a lead screw controller 28. What the row feed generator does is generate some number of steps to the lead screw controller for each row of drops printed. The lead screw controller generates one step in the lead screw stepper motor 29 for each pulse it receives from the row feed generator. The lead screw stepper motor rotates a lead screw 30 which translates the ink jet print head 25 across the paper.

The synchronized output from the drop stream generator, i.e., DROP DATA, is fed to a triggerable single cycle sine wave generator 23. Its function is to generate a single cycle of a sine wave for each logical value in DROP DATA that represents a drop. The circuitry needed to provide a triggerable single cycle sine wave generator is conventional, as for example, that used in the Hewlett-Packard 3310 Function Generator.

The period of the sine wave generated by the triggerable single cycle sine wave generator must be short enough to allow continuous printing of drops in consecutive drop positions. A formula for the minimum frequency, in terms of the drum diameter, desired drum RPM and desired number of drops per inch is derived below.

$$f_{min} = \frac{\text{cycles}}{\text{sec}} = \frac{\text{drops}}{\text{sec}} = \left(\frac{\text{drops}}{\text{rev}}\right)\left(\frac{\text{rev}}{\text{sec}}\right)$$

$$= \left(\frac{\text{drops}}{\text{inch}}\right)\left(\frac{\text{inches}}{\text{rev}}\right)\left(\frac{\text{rev}}{\text{sec}}\right)$$

$$= \left(\frac{\#\ \text{drops}}{\text{inch}}\right)(\pi\ \text{dia})\left(\frac{\text{RPM}}{60}\right)$$

In the present embodiment the ink jet print head is excited by individual cycles of 20 KHz. This allows the rotation of the three inch cylindrical drum to reach 832 RPM. Good results are obtained at this rate, as well as at any lower rates.

The output of the triggerable single cycle sine wave generator 23 is fed to a high voltage amplifier 24 whose output goes to the ink jet print head 25.

Figure 3:
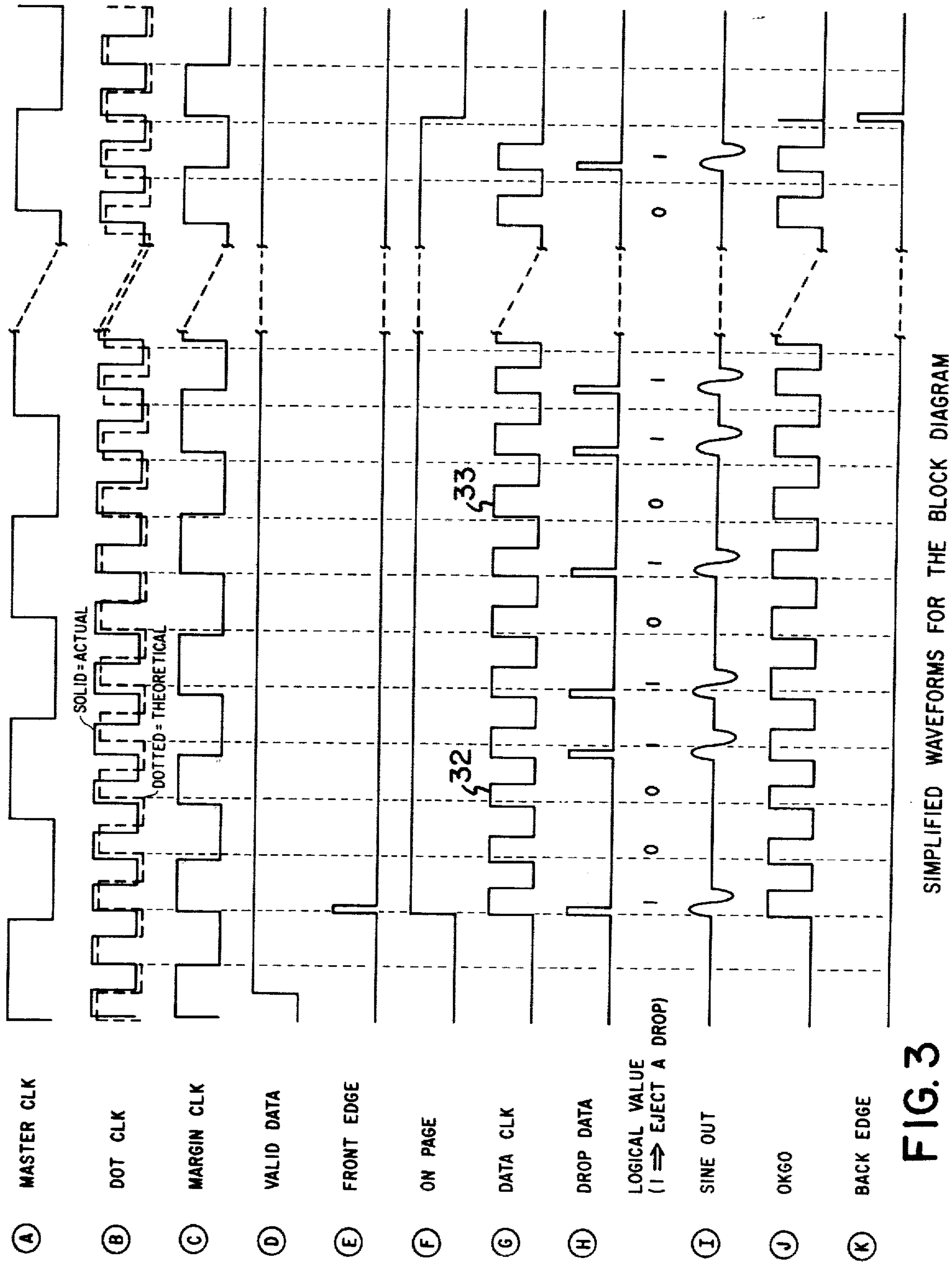
FIG. 3 is a simplified waveform diagram illustrating the operation of the block diagram of FIG. 2.

FIG. 3 is a waveform diagram illustrating the operation of the block diagram of FIG. 2. The signal DOT CLK is shown in two ways. The dotted version represents what would be obtained if the rotation of the cylindrical drum were absolutely constant. The actual type of signal obtained is illustrated by the solid line. When viewed together, the variations are easily seen. The resulting variations in the period of DATA CLK can be seen at locations identified by reference numerals 32 and 33. It is the change in the rate of DATA CLK that synchronizes the drop stream generator to changes in the angular velocity of the rotating drum.

I claim:

1. An ink jet printing apparatus for printing indicia representing data supplied by a data source, the apparatus comprising:

a cylindrical drum, rotatable about its longitudinal axis, for receiving upon the outside of its cylindrically curved surface a sheet of a recording medium onto which the indicia is to be printed;

a motor, for rotating the cylindrical drum about the longitudinal axis at some generally constant angular velocity, the rotation producing a repetitive and generally periodic displacement of the recording medium along a cylindrical path;

digital tachometer means, for indicating as some fixed number of pulses per revolution the angular velocity at which the cylindrical drum actually rotates;

logic means for producing, in response to the data supplied by the data source, a logic waveform having a series of logical values representing the series of ink drops that corresponds to the indicia representing the data, and also for synchronizing, in response to the pulses generated by the digital tachometer means, the generation of the logic waveform such that the transitions in the logic waveform occur only in response to the transitions of the pulses generated by the digital tachometer means;

wave generation means, for generating individual generally sinusoidal cycles of a waveform, the sinusoidal cycles having a given period and there being a single sinusoidal cycle synchronous with and in response to each logical value representing an ink drop, the recited synchronization of the logic means rendering harmless to the positional accuracy of the printed indicia any decrease in the angular velocity of the rotating cylindrical drum, and also rendering harmless to the positional accuracy of the printed indicia any increase in the angular velocity of the rotating cylindrical drum provided the increase is consistent with the ability of the wave generation means to sequentially and completely generate each of the individual sinusoidal cycles; and an electrically driven and piezoelectrically actuated ink jet print head, mounted in close physical proximity to the rotating cylindrical drum such that ink drops discharged by the ink jet print head impinge upon the recording medium, and whose piezoelectric actuating device is electrically connected to the output of the wave generation means, the ink jet print head for forming indicia on the recording medium by discharging an ink drop for each sinusoidal cycle generated by the wave generation means.

2. An ink jet printing apparatus as recited in claim 1 wherein the motor comprises a stepper motor.

* * * * *